United States Patent [19]

Pyzik et al.

[11] Patent Number: 5,098,631
[45] Date of Patent: Mar. 24, 1992

[54] METHOD OF PREPARING NEAR-NET SHAPE SILICON NITRIDE ARTICLES AND THE ARTICLES SO PREPARED

[75] Inventors: Aleksander J. Pyzik; Timothy L. Allen, both of Midland, Mich.

[73] Assignee: The Dow Chemical Company, Midland, Mich.

[21] Appl. No.: 582,046

[22] Filed: Sep. 13, 1990

[51] Int. Cl.$^5$ ............................................. C04B 35/58
[52] U.S. Cl. ................................. 264/332; 264/337; 264/338
[58] Field of Search ..................... 264/332, 337, 338

[56] References Cited

U.S. PATENT DOCUMENTS

| | | | |
|---|---|---|---|
| 3,830,652 | 8/1974 | Gazza | 264/332 |
| 3,989,438 | 11/1976 | Smith | 264/337 |
| 4,744,943 | 5/1988 | Timm | 419/10 |
| 4,883,776 | 11/1989 | Pyzik | 501/10 |
| 4,919,689 | 4/1990 | Pyzik | 51/309 |

FOREIGN PATENT DOCUMENTS 1387415  3/1975 United Kingdom ................ 264/332

OTHER PUBLICATIONS

Fulrath Hot Forming Processes, In Ceramic Bulletin, vol. 43, No. 12 (1964), pp. 880–885.

Primary Examiner—James Derrington
Attorney, Agent, or Firm—D. R. Howard

[57] ABSTRACT

Use a material which has a coefficient of thermal expansion greater than silicon nitride and does not react with silicon nitride under hot pressing conditions either to fabricate or to coat hot-pressing die plates suitable for densification of silicon nitride. The die plates separate cleanly from the silicon nitride thereby allowing preparation of near-net shapes having complex geometries, but without post densification grinding or machining.

2 Claims, No Drawings

METHOD OF PREPARING NEAR-NET SHAPE SILICON NITRIDE ARTICLES AND THE ARTICLES SO PREPARED

BACKGROUND OF THE INVENTION

The present invention generally concerns a method for fabricating near-net shape silicon nitride articles. The resultant articles require little, if any, post-densification machining or cleaning prior to use. The present invention more particularly concerns the fabrication of near net-shape self-reinforced silicon nitride articles.

SUMMARY OF THE INVENTION

One aspect of the present invention is a process for making near-net shape silicon nitride articles comprising hot pressing silicon nitride powder under conditions sufficient to convert the powder to a densified article using a die fabricated from a material which (a) is chemically stable when in contact with silicon nitride-based materials at temperatures of 1850° C. or less and (b) has a coefficient of thermal expansion greater than that of silicon nitride.

The present invention also includes a densified, near-net shape silicon nitride article of complex geometry having external surfaces which, in the absence of post-densification machining, are substantially free of reaction products between silicon nitride and die materials used in fabricating the article.

A second aspect of the present invention is a method of using titanium carbide as a die release agent comprising applying a suspension of titanium carbide powder in a volatile organic solvent to a hot press die surface and thereafter removing the solvent prior to use of the die in a hot pressing application.

A third aspect of the present invention is a method of reducing chemical reactions between hot press die surfaces and a silicon nitride composition during hot pressing. The method comprises interposing at least one layer of a material which is chemically stable when in contact with silicon nitride-based materials at hot pressing temperatures between the silicon nitride composition and the hot press die surfaces, the layer being sufficient to substantially preclude contact between the silicon nitride composition and the die surfaces.

DESCRIPTION OF PREFERRED EMBODIMENTS

The silicon nitride powder used as a starting material can be any silicon nitride powder, including the crystalline forms of α-silicon nitride and β-silicon nitride, or noncrystalline amorphous silicon nitride, or mixtures thereof. Silicon nitride powders which are predominately in the alpha crystalline form or the amorphous form or mixtures thereof provide satisfactory results. Those powders containing predominate amounts of the alpha crystalline form provide particularly satisfactory results. A high α/β weight ratio provides a number of benefits. The starting powder contains an amount of β-silicon nitride which is desirably less than about 20 weight percent, preferably less than about 10 weight percent and most preferably less than about 6 weight percent, based upon starting powder weight.

The silicon nitride powder is beneficially admixed with one or more compounds which will promote densification, enhance conversion of α-silicon nitride to β-silicon nitride or facilitate growth of β-silicon nitride whiskers. Suitable compounds, methods of preparing admixtures, and hot pressing parameters are disclosed in U.S. Pat. Nos. 4,883,776 and 4,919,689 and in copending application Ser. No. 07/398,801, filed Aug. 25, 1989. The relevant teachings of the patents and copending applications are incorporated herein by reference. The compounds disclosed in such teachings provide silicon nitride ceramic bodies including a crystalline phase and a glassy phase. The crystalline phase includes β-silicon nitride of which at least about 20 volume percent, measured in a plane by scanning electron microscopy, is in the form of whiskers having an average aspect ratio of at least about 2.5. The glassy phase, in an amount which does not exceed about 35 percent by weight, based upon total body weight, includes densification aids, conversion aids and whisker growth enhancing compounds.

Some compounds or derivatives may be useful as, for example, a densification aid in one combination of silicon nitride, densification aid, conversion aid and whisker growth enhancing compound, a conversion aid in a second combination or a whisker growth enhancing compound in a third combination. The suitability in a given combination depends upon a number of variables including amounts and choice of other compounds. Even though a particular derivative such as sodium oxide may be useful as any one of a densification aid, a conversion aid or a whisker growth enhancing compound in a given silicon nitride composition, the derivative cannot simultaneously serve two or even all three functions merely by increasing the amount. In other words, three different compounds or derivatives, each of which serves a different function, are preferably admixed with the silicon nitride powder. Each of the three compounds is, more preferably, based upon a different element from *The Periodic Table of the Elements*.

Densification aids include, for example, derivatives of magnesium, beryllium, calcium, strontium, barium, radium, lithium, sodium, potassium, rubidium, cesium, francium and silicon. Oxides of magnesium, silicon, calcium, strontium or sodium provide satisfactory results.

Conversion aids include, for example, derivatives of yttrium, scandium, actinium, lanthanum, lithium, sodium, potassium, rubidium, cesium and francium. Oxides of yttrium, lanthanum or sodium provide satisfactory results.

Whisker growth enhancing compounds include, for example, derivatives of calcium, sodium, potassium, scandium, titanium, vanadium, chromium, manganese, iron, cobalt, nickel, copper, zinc, strontium, zirconium, niobium, barium, lanthanum, and mixtures thereof, or an oxide of an element selected from the group consisting of gallium, indium, hafnium, tantalum and boron. Calcium oxide provides satisfactory results.

The die used to prepare near-net shape, densified silicon nitride articles must meet two criteria. First, it must be fabricated from a material which is chemically stable when in contact with silicon nitride-based materials at temperatures of 1850° C. or less. Second, it must have a coefficient of thermal expansion greater than silicon nitride.

Dies made from a material having chemical stability in contact with silicon nitride at elevated temperatures, e.g., 1650° C. to 1850° C., offer performance advantages over those without such stability. For example, chemically stable dies may be reused a number of times whereas dies lacking such stability may only be used once. A portion of the die material, particularly when the die material is graphite, reacts with silicon nitride to form a reaction product with strong bonds between graphite and silicon nitride. A portion of the die material also diffuses into the powdered silicon nitride admixture to form a layer with poor mechanical properties. This layer and the reaction product must be removed by post densification procedures such as machining or grinding. Although grinding of simple shapes poses no particular problems, grinding of complex shapes is costly and technically difficult.

Dies fabricated from a material having a coefficient of thermal expansion greater than that of the material being densified tend to shrink more upon cooling than the material being densified. If the die material is also chemically stable, the die shrinks away and separates cleanly from the material being densified.

As used herein, the term "complex geometry" refers to a shape having external surfaces which are not smooth and substantially planar. In other words, the external surfaces can be convoluted or replete with indentations or projections akin to a contour merge representing broken terrain on the Earth's surface. The indentations or projections may, in turn, be a collection of different shapes. On such shape might be a stack of concentric disks of progressively smaller diameters.

Hot pressing dies suitable for purposes of the present invention are fabricated from titanium carbide, a material having chemical stability in the presence of silicon nitride at temperatures as high as 1850° C. and a coefficient of thermal expansion greater than that of silicon nitride. The mean linear coefficients of thermal expansion for titanium carbide and silicon nitride over a range of 20°–1500° C. are, respectively, 8.2 and 3.2–3.6 $10^{-6}K^{-1}$. See, R. Morrell, *Handbook of Properties of Technical and Engineering Ceramics,* Her Majesty's Stationery Office, London, 1985, pp. 82, 83. Another suitable material is boron nitride.

Hot pressing with titanium carbide dies proceeds in the same manner as that disclosed in U.S. Pat. No. 4,919,689 previously cited and incorporated by reference. Hot pressing conditions include a temperature of from about 1650° C. to about 1875° C. and a pressure of from about 20 to about 45 MPa. Subsequent to hot pressing, the process further comprises a step whereby the die and article are cooled sufficiently to cause at least a partial separation of the die from the densified article. This partial separation, which occurs without application of external mechanical forces, eases removal of densified material from the dies and promotes clean, sharply defined projections or depressions on the surface of the densified material.

As an alternative to fabricating the entire die from a material such as titanium carbide, a suspension of titanium carbide powder in a volatile organic solvent may be applied to a hot press die surface. The titanium carbide powder, after removal of the solvent, forms a release coating. The solvent is suitably methanol.

In another alternative, titanium carbide may be used as a reaction barrier between silicon nitride and a material which reacts with silicon nitride at a temperature in excess of 1000° C. This simply involves interposing a preformed titanium carbide article or shape between the silicon nitride and the material in such a manner as to substantially preclude contact between the silicon nitride and said other material.

ILLUSTRATIVE EMBODIMENTS

The following examples are solely for purposes of illustration and are not to be construed as limiting the scope of the present invention. All parts and percentages are by weight unless other wise specified.

EXAMPLE ONE

Two sample pieces of densified TiC are placed in the bottom of 1½×2" graphite die which has its inner surfaces protected by a coating of a boron nitride suspension (with the solvents removed by warming on a hot plate), a layer of Grafoil®, a graphite foil commercially available from Union Carbide, and another thin layer of the boron nitride suspension.

The TiC samples are:

Sample A — A pyramidal piece with a height of 0.817 cm and base dimensions of 1.272 cm and 1.745 cm.

Sample B — A disk with a height of 0.797 cm and a diameter of 1.839 cm.

The pyramidal piece is prepared by hot pressing. The disk is prepared by rapid omnidirectional compaction as described in U.S. Pat. No. 4,744,943, the relevant portions of which are incorporated herein by reference.

A composition containing 88.0 percent silicon nitride, 2.43 percent yttria, 9.27 percent silica and 0.3 percent of calcium oxide (CaO) is suspended in 125 ml of ethanol and agitated at room temperature under air by means of a mechanical attritor for 1 hour to form a slurry of mixed powders. Attrition takes place in a 750 cc tank containing 1220 grams of 3/16 inch or 0.48 cm zirconia balls. The slurry has a solid content of 20 volume percent. The attritor operates at a speed of 200-250 revolutions per minute (rpm) for the first six minutes and 300 rpm for the last 54 minutes. The slurry is then poured through a 100 mesh nylon sieve. Oleic acid (fourteen drops) is added to flocculate the mixed powders out of suspension. The finely divided flocculated powders are dried in an oven at 70° C. for a period of 12 hours under a flow of dry nitrogen gas. After drying, the mixed powders are passed through a 60 mesh sieve.

The silicon nitride (UBE-SN-E-10) contains 1.20 percent oxygen, 0.08 percent carbon, and the following major metallic impurities: 49 parts per million (ppm) iron, 21 ppm Al, and 10 ppm Cr, Ni and Ca. The silicon nitride is present in the alpha and beta crystalline forms in an $\alpha/\beta$ weight ratio of 95/5. The BET surface area of the silicon nitride powder is 10 m$^2$/g and the average particle size is about 0.2 μm in diameter.

The silica (Cab-O-Sil, Lot IF 054, Grade L-90 (Cabot Corporation)) has a BET surface area of 100m$^2$/g and an average particle diameter of 0.027 μm. The silica contains the following major metallic impurities: <2 ppm Al, <5 ppm Zr, and <2 ppm of V, Ti and Ca combined.

The yttrium oxide (Molycorp) contains less than 10 ppm each of sodium and iron. The Y$_2$O$_3$ particles range in size from 2 μm to 5 μm in diameter.

An 80 gram quantity of the dried, mixed powders is placed into the die. The die is then placed in a hot press chamber. A running atmosphere for the chamber is obtained by twice evacuating to 300 millitorr and back filling with nitrogen. A light flow (2L/min) of nitrogen is maintained throughout the run.

The die and it contents are heated according to the following schedule: heat to a temperature of 200° C. over a period of ten minutes; heat to a temperature of 1100° C. over a period of 30 minutes; hold for 30 minutes at 1100° C.; heat to a temperature of 1775° C. over a 25 minute period; heat to a temperature of 1825° C. over a period of 5 minutes; and then to a temperature of 1850° C. over a period of 5 minutes. The final temperature is maintained for a period of 60 minutes. The power is then shut off and the hot press is allowed to cool to 100° C. over a period of 2½ hours.

A minimum load of 1 kilogram is applied at the beginning of the heating schedule. At the beginning of the 1100° C. hold, a load corresponding to a pressure of 5000 psi (34 MPa) is applied. The 34 MPa load is maintained until 10 minutes after the power is shut off. The load is then reduced to the minimum value of 1 kilogram over a period of five minutes and maintained at that value until the end of the 2½ hour cooling period.

The cooled die and its contents are removed from the hot press. The hot pressed silicon nitride composition in the form of a block is removed from the die and cleaned by sand blasting. Sample A is easily removed from the $Si_3N_4$ block. Sample B, while loose within the $Si_3N_4$ block, is held in because the bottom diameter of the TiC disk is slightly larger than the diameter of the top.

A visual examination of interfacial contact (between $Si_3N_4$ and TiC) shows smooth surfaces which are free from signs of reaction or diffusion. By contrast, unprotected graphite die is almost welded to $Si_3N_4$ by yellowish-reaction layer (SiC). Sections of the $Si_3N_4$ from the interfacial areas are polished and examined optically and by scanning electron microscopy (SEM). The examinations disclose microstructures quite similar to those disclosed in U.S. Pat. No. 4,883,776 previously incorporated by reference. The dimensions of sample A were virtually unchanged. The final dimensions of sample B are a height of 0.700 cm (12% reduction) and a diameter of 1.969 cm (6.6% increase). The size change from the original dimensions is believed to occur because of plastic deformation of TiC while in the die.

EXAMPLE TWO

A 2½×3" (6.4×7.6 cm) plate of TiC (240 grams) is hot pressed with heating and load schedules similar to those described in Example 1 save for a final hold temperature of 1800° C. rather than 1850° C. The TiC plate is placed in the bottom of a graphite hot press die which is then filled with 170 grams of the $Si_3N_4$ composition as in Example 1. The die and its contents are hot pressed as in Example 1. After hot pressing, the TiC plate releases cleanly and without evidence of reaction with the $Si_3N_4$.

EXAMPLE THREE

A graphite hot press die like that used in Example 2 is treated with a suspension of TiC powder. The suspension contains 13.7 parts TiC (0.7 micrometer powder), 0.3 parts methylcellulose (A15-LV, produced by The Dow Chemical Company), 15 parts ethanol, and 25 parts deionized water.

The suspension is prepared by first adding the methylcellulose to the ethanol. The methylcellulose/ethanol mix is stirred for three hours after which the water is added. While continuing stirring, the TiC is added. After adding all of the TiC, stirring continues for two hours.

The die parts are heated on a hot plate to a temperature of 100° C. The interior die surfaces are coated with the suspension using an air brush. The die parts are allowed to cool before covering the interior surfaces with a sheet of Grafoil ®. The die parts are then returned to the hot plate, heated to 100° C., and given a second coating of the TiC suspension.

The die is assembled and used in a hot-pressing as described in Example 2. An examination of the hot pressed parts shows no discernible reaction between the $Si_3N_4$ and the die pieces. Due to the "sticky" nature of the TiC powder, the die pieces do not release as easily as when a boron nitride suspension is used. The resultant hot pressed silicon nitride material requires minimal cleaning to remove residual die coating material.

Examples 1-3 show the suitability of TiC as a hot press die material or as a coating for hot press dies. Similar results are expected with other silicon nitride compositions such as those disclosed in U.S. Pat. Nos. 4,883,776 and 4,919,689 and in copending applications Ser. No. 07/398,801, filed Aug. 25, 1989.

What is claimed is:

1. A process for making near-net shape silicon nitride articles comprising hot pressing silicon nitride powder at a temperature of from about 1650° C. to about 1875° C. and a pressure of from about 20 to about 45 MPa to convert the powder to a densified article using a die fabricated from titanium carbide, a material which (a) is chemically stable when in contact with silicon nitride-based materials at temperatures of 1850° C. or less and (b) has a coefficient of thermal expansion greater than that of silicon nitride.

2. The process of claim 1 further comprising a step whereby the die and article are cooled sufficiently to cause at least a partial separation of the die from the densified article.

* * * * *